UNITED STATES PATENT OFFICE.

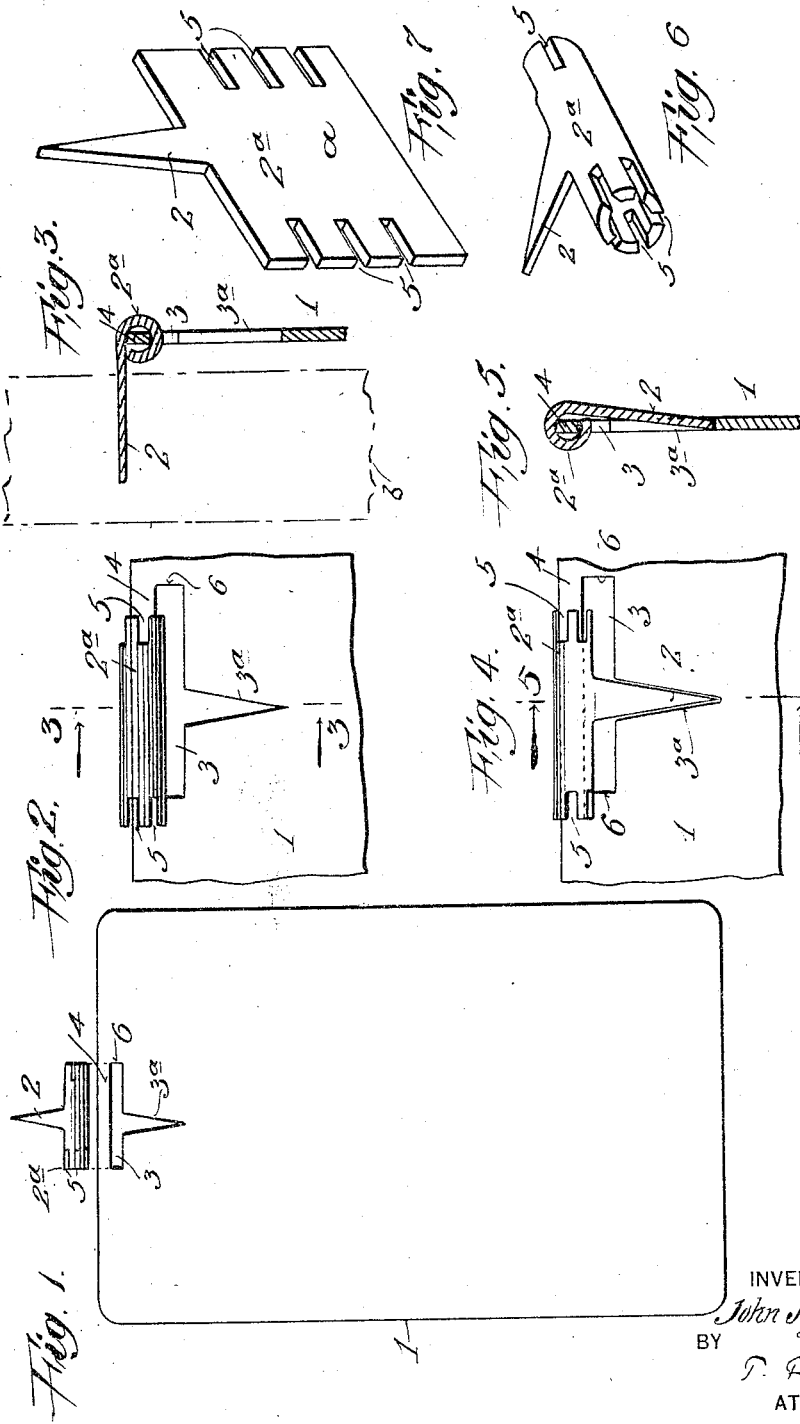

JOHN JAY GARRISON, OF WASHINGTON, DISTRICT OF COLUMBIA.

MIRROR.

1,286,990.

Specification of Letters Patent.

Patented Dec. 10, 1918.

Application filed September 16, 1918. Serial No. 254,241.

*To all whom it may concern:*

Be it known that I, JOHN JAY GARRISON, a citizen of the United States, and resident of Washington, District of Columbia, have invented certain new and useful Improvements in Mirrors, of which the following is a specification.

My invention has reference to mirrors particularly adapted for use for shaving and toilet purposes, such as mirrors made from sheets of polished metal, and has for its object to provide means to permit the mirror to be hung or stood in a convenient position for use.

In carrying out my invention I provide a mirror of the class specified with an adjustable projection adapted to enter a support for sustaining the mirror and with means to retain said projection in angular relation to the mirror so that the latter may be supported in front of the user in a vertical position or at a desired angle.

My invention comprises novel details of improvement and combinations of parts that will be more fully hereinafter set forth and then pointed out in the claims.

Reference is to be had to the accompanying drawings forming part hereof, wherein, Figure 1 is a face view of a mirror and its supporting projection before assemblage of said parts; Fig. 2 is an enlarged view of a portion of the mirror and its supporting projection in position for use; Fig. 3 is a section on the line 3, 3, in Fig. 2; Fig. 4 is a view similar to Fig. 2, showing the supporting projection folded in position for storage; Fig. 5 is a section on the line 5, 5, in Fig. 4; Fig. 6 is a detail perspective view of the mirror supporting projection; and Fig. 7 is a face view of a blank from which said projection may be made.

Similar numerals of reference indicate corresponding parts in the several views.

The mirror 1 may be of any suitable construction, such as a sheet of polished metal, as, for instance, polished steel of desired thickness and area. At 2 is a support for the mirror shown in the form of a sharpened projection or prong adapted to enter the part to which the mirror is to be attached for use. Said projection or prong is journaled upon the mirror in such a manner as to extend at a desired angle therefrom, and also to be folded relatively to the plane of the mirror. The mirror is shown provided with a slot or opening at 3, located adjacent to one edge of the mirror, providing a bar 4 upon which projection 2 is journaled. Said projection is shown provided with a coiled or tubular member $2^a$ journaled upon the bar 4, being adapted to rotate partly within the slot 3. The projection or prong 2 and its supporting member $2^a$ may be made from a suitable blank of metal $a$, indicated in Fig. 7, which may be stamped to desired shape and the member $2^a$ thereof may be rolled upon or bent around bar 4 of the mirror by any suitable means. I provide means to retain or lock the member $2^a$ upon the mirror with the projection 2 at an angle to the plane of the mirror. For such purpose I have shown the end portions of member $2^a$ provided with longitudinally disposed slots 5 adapted to receive the metal 6 of the mirror at the corresponding ends of slot 3, whereby member $2^a$ is retained from rotating on the bar 4. While I have shown slots 5 at each end of member $2^a$ it will be obvious that such slots may be formed at one or both ends of said member as may be preferred, and that any desired number of said slots may be provided at the end or ends of said member. The slots 5 at one end of member $2^a$ may be in staggered relation to the slots 5 at the opposite end to provide strength in the member $2^a$ while enabling the projection 2 to be retained at varying angles with respect to the plane of the mirror as desired. The member $2^a$ is of such length as to rotate within slot 3, and when it is desired to retain projection or prong 2 extending outwardly from the mirror, the member 2 may be rotated the desired extent and then moved lengthwise to cause one of its slots 5 to receive the material 6 of the mirror, as indicated in Figs. 3 and 4.

The slot 3 is shown extending inwardly along the mirror at the portion $3^a$ to receive the projection or prong 2, (as indicated in Figs. 4 and 5) when the mirror is to be stored, as when placed in a case or carrier. The position of portion $3^a$ of slot 3 may be at one side of the center of slot 3, whereby when projection 2 is entered in said portion $3^a$ of the slot one of the slots 5 of member $2^a$ will receive the adjacent portion 6 of the mirror to keep the projection 2 from rotating out of slot portion $3^a$, thereby to retain said projection within the material of the mirror when not in use.

When my improved mirror is to be used, as for hanging it from a support, the projection 2 will be swung outwardly to a desired angle respecting the plane of the mirror, and then the projection 2 with its member 2ª may be slid along bar 4 to cause one of the slots 5 to receive the adjacent material 6 of the mirror, whereupon the projection or prong 2 may be pushed into such support $h$ (Fig. 3) to cause the mirror to hang in the desired position either vertically or at an angle in front of the user. It will be obvious that the mirror may be retained in a reverse position, that is to say, the projection 2, instead of being utilized at the top of the mirror may be entered in a support at the bottom of the mirror, so that the latter will extend upwardly from the projection 2 instead of hanging therefrom, and the mirror then may be vertical or inclined at a desired angle in front of the user.

My invention is simple and cheap to manufacture, may be readily operated, and affords convenient means for supporting the mirror in desired position, being particularly useful for army, navy and camping uses.

Having now described my invention what I claim is:

1. The combination of a mirror having a bar, a supporting projection having a member journaled upon the bar, and interengaging elements between said member and the mirror for retaining the projection at an angle to the mirror.

2. The combination of a mirror having a slot providing a bar, with a projection provided with a member journaled upon the bar and having means to engage the mirror to retain the projection at an angle thereto.

3. The combination of a mirror having a slot provided with an extended portion, said mirror having a bar along the slot, and a supporting projection having a member journaled upon the bar and adapted to enter the extended portion of the slot.

4. The combination of a mirror having a slot provided with an extended portion, said mirror having a bar along the slot, and a supporting projection having a member journaled upon the bar and adapted to enter the extended portion of the slot, and means coöperative between said member and mirror for retaining the projection at an angle to the mirror and within the projecting portion of the slot.

Signed at New York city, in the county of New York, and State of New York, this 14th day of September, A. D. 1918.

JOHN JAY GARRISON.

Copies of this patent may be obtained for five cents each, by addressing the "Commissioner of Patents, Washington, D. C."